(No Model.)
T. S. JUDSON.
RUBBER HOSE.
No. 375,877. Patented Jan. 3, 1888.
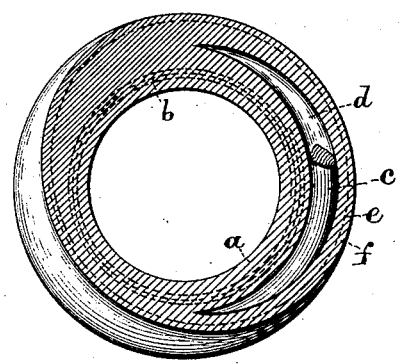
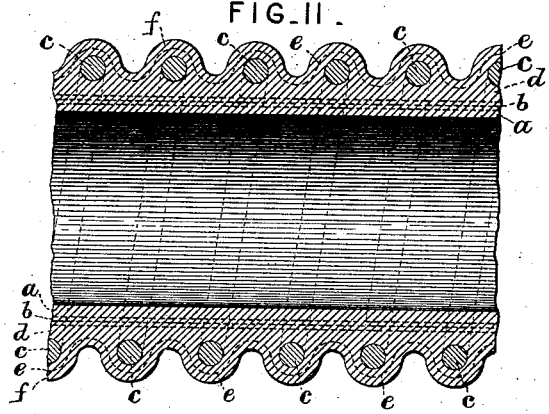
Attest:
Geo. T. Smallwood,
Philip Mauro
Inventor
Thomas S. Judson
By A. Pollok, his atty.
N. PETERS, Photo-Lithographer, Washington, D. C.

UNITED STATES PATENT OFFICE.

THOMAS S. JUDSON, OF MATTEAWAN, ASSIGNOR TO THE NEW YORK RUBBER COMPANY, OF NEW YORK, N. Y.

RUBBER HOSE.

SPECIFICATION forming part of Letters Patent No. 375,877, dated January 3, 1888.

Application filed December 14, 1886. Serial No. 221,564. (No model.)

*To all whom it may concern:*

Be it known that I, THOMAS S. JUDSON, of Matteawan, Dutchess county, State of New York, have invented a new and useful Improvement in India-Rubber Hose, which invention is fully set forth in the following specification.

My invention relates to an improvement in the manufacture of rubber hose intended to be used where great strength, lightness, and flexibility must be combined—such, for instance, as is required for use in connection with pressure-brakes on railways.

Numerous efforts have been made to increase the strength of the hose without increasing its weight; but they have for the most part been directed toward the improvement of suction-hose and preventing the same from collapsing rather than to increase its tensile strength or strength in holding together against a great pressure from the interior of the hose.

My improved hose is constructed in the usual way with an inner layer of rubber and two or more successive layers of duck coated with rubber by a friction-machine, or in any other suitable way. Between two layers of duck, and preferably between the outermost layer and the one next to it toward the interior of the hose, is placed a spiral coil of wire wound around in such a manner that the different coils of wire will not be in contact, but will be separated a sufficient distance to give the necessary flexibility to the hose. The hose being built up in this manner, with a layer of vulcanizable gum on the interior, and next to that one or more plies of duck coated with vulcanizable gum, the wire is wound around in a spiral, as described, and next outside of that there is another ply of duck coated with vulcanizable gum, and, finally, on the exterior there is preferably a coating of rubber in the usual way. The rubber is then vulcanized, the various parts become firmly united together, and the whole becomes, as it were, one piece. The wire may, without materially affecting the nature of my invention, be placed in a coating of vulcanizable gum placed between the two said layers of duck just described. The wire is stronger and less elastic than the other materials composing the hose, and this fact will assist in preventing the hose from splitting under great internal pressure until the strain is such as to tear the wire by what practically amounts to tearing it apart by an almost direct pull in the direction of its length, the curve of the wire, however, somewhat modifying the nature of the pull. The immense tensile strength of metallic wire (in copper wire over sixty thousand pounds to the square inch) is well known, and in my improved hose this tensile strength is utilized to strengthen the hose against pressure from the inside. The outer coating of the duck naturally tends to follow the line of the wire, and is thereby slightly corrugated, although, of course, an even exterior can readily be produced, if necessary.

Where the hose is of considerable thickness and great flexibility is desired, increased flexibility in the hose will be secured by making the hose more corrugated by methods obvious to those skilled in the art, as by using a mold having the desired configuration, the wire, of course, passing through the elevated part of the corrugations. In this manner a hose is made which has a greater strength than ever before attained in any other hose. It possesses greater flexibility and lightness in proportion to strength than any other hose and is comparatively inexpensive.

A six-ply hose made in the ordinary way is not so strong as a three-ply hose made in the above-described way, and thus, so far as the duck and friction-coat are concerned, there is a saving of at least fifty per cent., and these elements are the principal ones in the cost of the hose.

In the accompanying drawings, Figure I is a cross-section, and Fig. II a longitudinal section, of a piece of hose constructed in accordance with the invention.

In the drawings, *a* represents the inner layer of rubber, and *b* the successive plies of duck coated with rubber surrounding the inner layer, *a*. The wire *c*, embedded in a layer or coating, *d*, of rubber, is wound spirally around the layer *b* and is surrounded by the layer *e*, of duck coated with rubber. An outer layer, *f*, of rubber surrounds the entire tube.

What I claim, and desire to secure by Letters Patent, is—

1. An india-rubber hose containing two or more plies of duck or other fibrous material coated with rubber and having an inner layer or lining of rubber, and a coil or spiral of wire whose coils are sufficiently far apart to render the hose flexible interposed between two layers of such fabric, the whole tube being vulcanized, substantially as described.

2. An india-rubber hose consisting of an inner layer of rubber, two or more layers of duck or other fibrous material coated with rubber, a coil or spiral of wire embedded in a layer of rubber just beneath the outermost layer of duck or other fibrous material, and an outer layer or coating of rubber, substantially as described.

3. A corrugated india-rubber hose having two or more layers of duck or other fabric coated with rubber, and a spiral or coil of wire inclosed between two of said layers, the coils being under the ridges of the corrugations, substantially as described.

In testimony whereof I have signed this specification in the presence of two subscribing witnesses.

T. S. JUDSON.

Witnesses:
JACKSON W. ALWARD,
JOHN McCLURE.